United States Patent [19]
Murvall

[11] 4,114,825
[45] Sep. 19, 1978

[54] FISHING REEL WITH A LINE SPREADING DEVICE

[75] Inventor: Åke Eugen Murvall, Svängsta, Sweden

[73] Assignee: ABU Aktiebolag, Svängsta, Sweden

[21] Appl. No.: 701,964

[22] Filed: Jul. 1, 1976

[30] Foreign Application Priority Data

Jul. 3, 1975 [SE] Sweden .................... 7507630

[51] Int. Cl.² .............................. A01K 89/01
[52] U.S. Cl. ............................. 242/84.21 R
[58] Field of Search ............ 242/84.21 R, 84.21 A, 242/84.4

[56] References Cited

U.S. PATENT DOCUMENTS

| | | | |
|---|---|---|---|
| 2,799,457 | 7/1957 | Martini | 242/84.21 R |
| 2,990,130 | 6/1961 | Pons | 242/84.21 R |
| 3,055,607 | 9/1962 | Schultz | 242/84.21 R |
| 3,224,703 | 12/1965 | Clark | 242/84.21 A |
| 3,348,788 | 10/1967 | Vinokur | 242/84.21 R |
| 3,946,963 | 3/1976 | Oberg | 242/84.21 R |

FOREIGN PATENT DOCUMENTS

| | | | |
|---|---|---|---|
| 887,877 | 8/1943 | France | 242/84.21 R |
| 694,177 | 9/1965 | Italy | 242/84.21 R |

Primary Examiner—Billy S. Taylor
Attorney, Agent, or Firm—Karl W. Flocks

[57] ABSTRACT

In a fishing reel having a line spool which is non-rotatable during casting, a line spreading device driven by the hand crank of the reel and comprising a cam mechanism including a cam member which is rotatable by the hand crank, a cam follower cooperating with said cam member, a pivotable arm connected to be pivoted by the cam follower, and a dog pivotally connected to the arm and connected to reciprocate the line spool, said cam member having a cam profile which together with the rotational speed of the cam member determines the pitch of the line when the line is wound on the line spool and the distribution of the line on the spool.

7 Claims, 3 Drawing Figures

FISHING REEL WITH A LINE SPREADING DEVICE

The present invention relates to a non-rotary fishing reel having a line spreading device.

A non-rotary type reel with line spreading device is, as is well known, a fishing reel provided with a line spool which does not rotate during casting and with a member which is rotatable by means of a hand crank, via a transmission, for winding the line of the spool, said line spreading device including a slidably mounted shaft carrying the spool and being reciprocable via a drive means cooperating with the drive transmission for the line winding member for spreading the line on the spool by reciprocating the spool axially during winding.

The line spreading device most frequently used comprises an eccentric pin connected to reciprocate the slidably mounted shaft and supported to be driven by a main or bevel gear connected to be driven by the hand.

One disadvantage of such line spreading devices is that the spool effects one forward and backward stroke for each revolution of the crank, which makes the pitch of line spread very steep so that the turns of the line cross at great angles. This results in the spool being filled to a low degree, which implies that the wound line will lie loose and resiliently on the spool.

Normally the non-rotary type reels are provided with a friction brake which produces resistance when the fish pulls out the line. The loose application of the line on the spool then creates the problem that the line will have a tendency to cut down into the underlying line layers. The steep pitch of the line spread also gives inferior casting properties owing to an uneven line output when the line is running out during casting, which depends on the fact that the line during casting will travel with a very fast reciprocatory movement on the spool.

The line spreading device of the eccentric pin type also has the disadvantage that the line spread becomes irregular, i.e. the spread will be relatively large in the midposition between the turning positions and will decrease successively towards the turning positions, which means that a larger amount of line is applied at the ends of the spool than in the intermediate portion thereof. This is usually compensated for by choosing a line spread which is considerably shorter than the spool width (i.e. the axial extent of the spool) but this results in the line being laid in a very loose manner at the end positions.

In another previously known type of line spread the eccentric movement is reduced by means of a reduction gear including an additional gear wheel or pinion fixed to the shaft which is driven by the hand crank and drives directly or via intermediate pinions a gear wheel which supports the eccentric pin. This gives a slower line spread movement, which gives the line spread a finer pitch but the additional pinion requires a relatively large space in the reel frame, and the slower the line spread chosen the larger the space required for the gear.

Since a compact design and small dimensions are desired one has, in case of the last-mentioned type of line spreading device, to content oneself with a line spread in which two revolutions of the crank are required for a complete forward and backward movement of the spool. This confined gear reduction gives some improvement but is still unsatisfactory, and the disadvantages of the eccentric motion still remain.

A much better line spread is generally provided by the so-called multiplicator reels, i.e. reels having a line spool which rotates during casting and the central axis of which is at right angles to the casting direction. In such reels the line spread is strongly reduced and the line spreading motion is normally obtained by means of a lead screw. This strong gear reduction and the even pitch of the lead screw give a regular and tight spread of the line which fills the spool to a high degree, and a firm and compact application of the line.

The object of this invention is to provide a fishing reel of non-rotating type with a compact line spreading device wich requires little space and gives a wide freedom of choice for desired gear reduction with a possibility of obtaining the same regular and tight application of the line as is the case with multiplicator reels.

This object has been achieved by the present invention wherein the line spreading device for reciprocating the spool shaft comprises a cam member, including a cam profile, carried on the same axis as the main gear wheel and being rotatable by said drive member, and a drive mechanism for the spool shaft driven by said cam profile.

Other objects and advantages of the invention will become apparent from the following description and claims.

The invention will be described in more detail below by way of example, reference being made to the accompanying drawings, in which.

Figure 1:
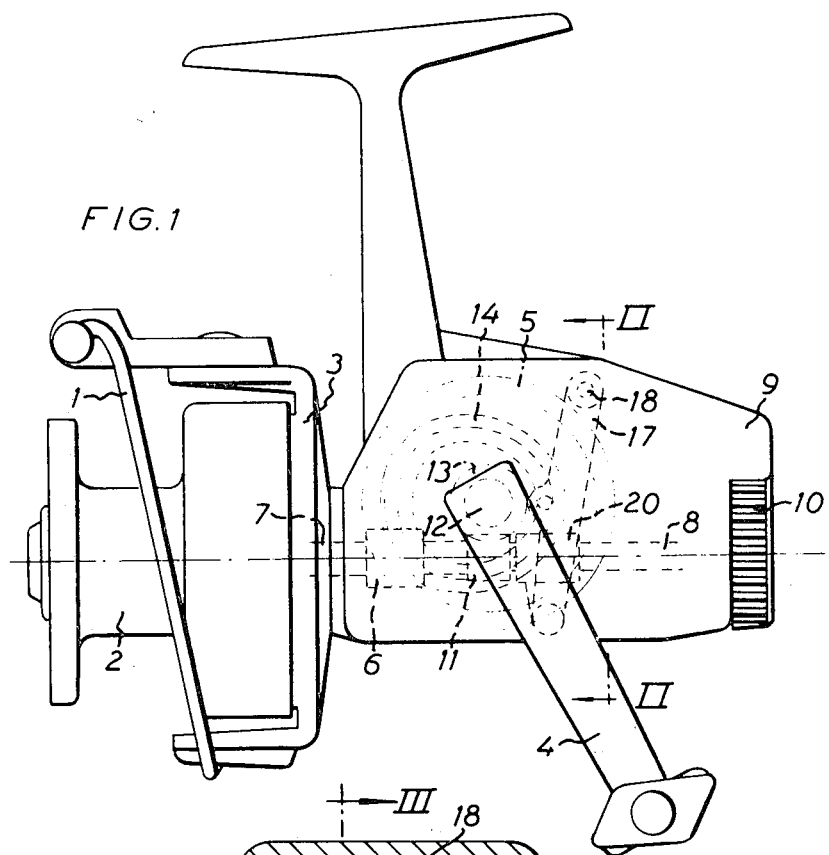
FIG. 1 shows a non-rotary type reel having a rotatable line winding member and provided with a line spreading device according to the invention represented by dashed and dot-dash lines.
Figure 2:
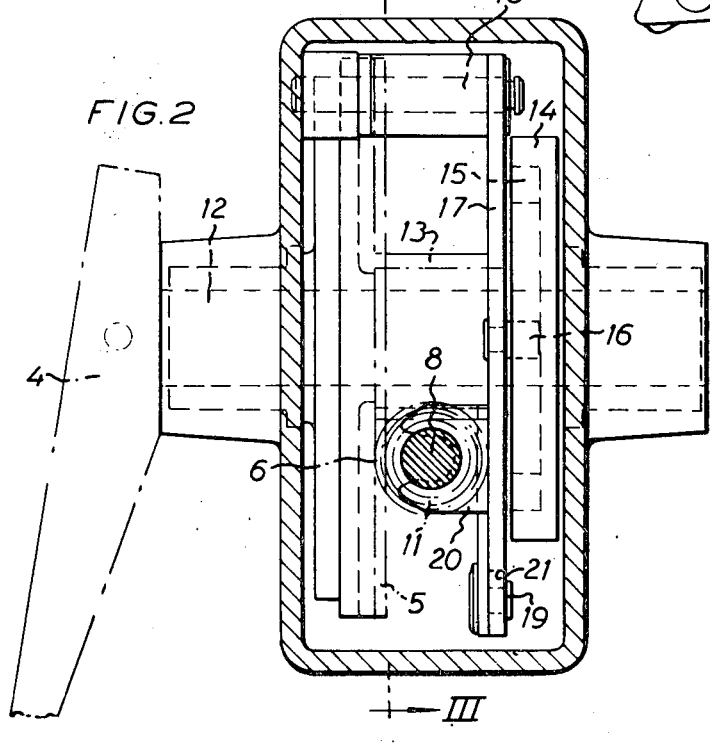
FIG. 2 shows the gear housing on a larger scale as seen in the direction indicated by arrows II—II in FIG. 1.

The non-rotary type reel illustrated in the drawings is a so-called open, non-rotary type reel having a rotary line winding member 1 for laying the line on a reciprocatory line spool 2. The member 1 has the form of a stirrup carried on a rotatably mounted base member 3 which is driven by means of the crank 4, via a worm wheel 5 connected with the crank, and a worm screw 6 which is fixed to or formed on a hollow spindle 7 by means of which the rotatable member 3 with the arm 1 can be rotated. Mounted in the hollow spindle 7 is an axially reciprocatory rod 8 the rear end portion and mounting of which are not shown. The reel may be equipped with a braking means, for instance a braking means comprising a control knob 10 provided at the rear of the reel frame.

The line spreading device according to the invention includes a screw gear comprising a screw 11 carried on the shaft 7 driven by the crank via the worm gear described above, and a gear wheel 13 freely rotatably mounted on the crank spindle 12, and also a cam disc 14 which is connected with the gear wheel 13 and supported coaxially with the main gear wheel 5 on that side of the drive shaft 7 of the winding member 3 which is opposite to the gear wheel, said cam disc having on the side facing the main gear wheel a cam groove 15 which is engaged by a cam follower pin 16 on a cam follower arm 17 which at one end is pivotally mounted on a shaft 18 in the reel frame and the other end of which is hingedly connected by a hinge means 19 with a dog 20 attached to the spool shaft 8.

The device described above operates as follows.

When the crank is turned the main gear wheel 5 drives the drive shaft 7 of the line winding member via the worm wheel 6 at a speed dependent on the gear ratio between the wheels 5 and 6. In this connection also the cam disc 14 is driven at a spaced dependent on the gear ratio between the drive members 5, 6, 11 and 13, and the pivoting movement of the cam follower arm 17 for reciprocating the spool shaft 8 is dependent on the above-mentioned gear ratio and also on the maximum and minimum radii of the cam groove profile.

In the embodiment shown there has been chosen for the operation of the cam disc 14 a screw gear which permits a strong gear reduction with respect to the operation of the shaft 7. The cam disc groove 15 may simply be formed so as to produce an even reciprocatory motion of the spool shaft 8 and the spool 2 but of course it is possible to give the reciprocatory motion of the spool another character, if so desired. The stroke of the spool may be "magnified" via the cam follower arm 17. Thus the cam disc 14 may have a smaller or, anyhow, not a greater diameter than the large main gear wheel 5 and it requires, diametrically, no increase of the dimensions of the reel frame 9. On the other hand, this would require a wider frame which, however, provides a better mounting for the crank spindle which is mounted in bearings in the opposite end walls of the reel frame. This design would also provide the possiblity of making the crank movable so that the reel could be used both for right-hand and left-hand turning of the crank. Finally the length of the reel frame may be relatively short because the cam follower arm 17 with the dog 20 on the spool shaft 8 largely operates in the area between the main gear wheel 5 and the cam disc 14. The arrangement of the cam disc or, more generally, the cam profile, on the same shaft as the large main drive 5 will thus achieve several great advantages from a space saving and functional point of view, and the arrangement of a screw gear for driving the cam disc 6 saves space and permits strong gear reduction.

The device of the invention thus is very compact and requires little space and it permits choosing the most suitable line spreading pitch including a very even, tight and firm application of the line which fills the spool to a high degree.

Figure 3:
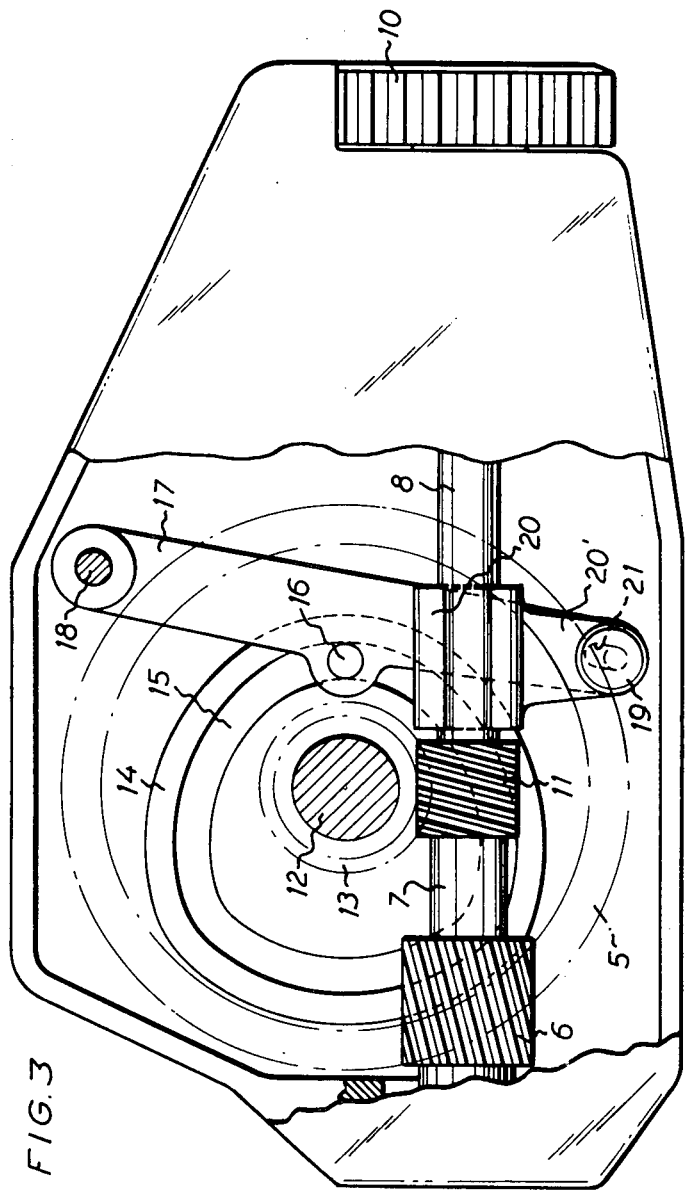
FIG. 3 shows a longitudinal section of the gear housing along line III—III in FIG. 2.

As shown in FIG. 3 the depth (the dimension at right angles to the shafts 7, 8) of the frame 9 has been chosen principally with respect to the diameter of the gear wheel 5. The length of the cam follower arm 17 has been chosen as great as possible, and in the embodiment shown the arm 17 extends from the pivot axis 18 past the spool shaft 8 and has at its outer end a slot 21 engaging a pivot pin 19 on the projection 20' of the dog 20 in order to give the reciprocatory motion of the spool shaft 8 a stroke length which is great with regard to the position of the pin 16 and the dimension of the cam profile 15, since the arm 17 may, owing to the cam guide, have a stroke length which is at a maximum with respect to the width of the spool 2 (i.e. the axial extent of the spool) but of course the arrangement of the arm 17 and its connection with the dog 20 as well as the cam profile 15 may be modified to fit the dimensions of the non-rotary type reel concerned. The arrangement according to the invention is suitable also for so-called closed non-rotary type reels, i.e. reels having a line-winding cup instead of a stirrup, and also for small non-rotary type reels. The position of the cam member right opposite the main gear wheel and the transmission in the form of a compact screw gear permits, also in case of small non-rotary type reels, said desired reduction to a gear ratio substantially lower than 2:1 of the number of revolutions of the shaft 7 to that of the cam member 14 for the desired slow reciprocatory motion of the spool shaft 8.

It is to be observed that the cam disc 14 may be supported on a shaft having its geometrical axis parallel to but spaced from the geometrical axis of the shaft 12. The cam disc 14 may have a gear wheel coupled to be driven by a gear wheel supported on the shaft 12. In this case, the dog 20 and the arm 17 should be located in a position rearwardly of the position shown in FIG. 3 to provide space for a transmission between the shaft 12 or the gear wheel 13, or the gear wheel 13 may be incorporated in said transmission.

What I claim and desire to secure by Letters Patent is:

1. A fishing reel comprising
   a line spool which is axially reciprocably supported,
   a winding mechanism located for winding a line on said spool,
   a line spreading device for spreading the line on said spool by reciprocation of said spool when the line is wound thereon,
   transmission means to rotate said winding mechanism and reciprocate said line spool,
   a hand crank supported on a shaft, said transmission means connected to said shaft,
   said transmission means including
      a face gear means having a main gear wheel mounted on said crank supporting shaft,
   said line spreading device including
      a reciprocably mounted shaft supporting said spool,
      a drive means cooperating with said transmission means for reciprocating said reciprocably mounted shaft and said spool to spread the line on said spool during winding,
      an independently rotatable cam member supported for free rotation on an axis which is parallel with the longitudinal axis of said crank supporting shaft and the axis of said main gear wheel and connected to be rotated by said transmission means,
      a cam profile on said cam member,
      a drive mechanism connected to be driven by said cam profile and to reciprocate said reciprocably mounted shaft,
   said drive mechanism including
      a cam follower,
      a pivotally mounted arm connected to said cam follower for pivoting by said cam follower, and
      a dog mounted on said reciprocably mounted shaft and pivotally connected to said arm, the pivot axis between said arm and said dog being spaced from the pivot axis of said pivotally mounted arm,
      said cam follower supported by said arm at a point between said axes
   said rotatable cam member including a cam disc having said cam profile in the form of a groove on said cam disc,
   said cam follower being a pin supported by said arm and engaging said groove on said cam disc,
   said face gear means further including
      a worm screw having the form of a worm wheel carried on said reciprocably mounted shaft and driven by said main gear wheel, and a screw gear including both
a screw,
and a gear wheel mounted coaxially with said main gear wheel, which is driven by said screw and adapted to drive said cam member.

2. A device as claimed in claim 1, wherein said cam member and said main gear wheel are mounted on said hand crank shaft on either side of said shaft of said line spreading device.

3. A device as claimed in claim 1, wherein gear mechanism in said transmission means has a gear ratio which is substantially less than 2:1, for driving said cam member at a number of revolutions which is less than half of that of said line winding member.

4. A device as claimed in claim 1, wherein said arm is arranged to reciprocate said reciprocably mounted shaft with a stroke length which is greater than the difference between the maximum and minimum radii of said cam profile.

5. A device as claimed in claim 4, wherein said arm is pivotally connected with said dog by means of a pivot pin which displaceably engages a slot permitting the pivot pin a limited movement in the longitudinal direction of the arm with substantially no lost motion for the arm driving the spool shaft via said dog.

6. A device as claimed in claim 1 for use in non-rotary type reels having a frame which comprises a housing having two opposite side walls, said main gear wheel being fixed to said crank supporting shaft being supported in the housing close to one of said end walls, wherein said crank supporting shaft extends through the housing and is rotatably supported in both of said side walls, and wherein said cam member is rotatably supported close to the inside of the other side wall of said housing.

7. A device as claimed in claim 1 wherein said cam profile is arranged to drive, via said cam follower, said arm and said dog, said reciprocably mounted shaft at a varying stroke speed of such a character that the amount of line on the spool will be evenly distributed throughout the length of the spool during the application of the line.

* * * * *